(12) United States Patent
Olson et al.

(10) Patent No.: US 12,433,597 B2
(45) Date of Patent: Oct. 7, 2025

(54) ATRAUMATIC OCCLUSIVE SYSTEM WITH COMPARTMENT FOR MEASUREMENT OF VASCULAR PRESSURE CHANGE

(71) Applicant: TriSalus Life Sciences, Inc., Westminster, CO (US)

(72) Inventors: Erik Dean Olson, Castle Rock, CO (US); David Benjamin Jaroch, Arvada, CO (US); Patrick Charles McCain, Denver, CO (US); Aravind Arepally, Atlanta, GA (US)

(73) Assignee: TriSalus Life Sciences, Inc., Westminster, CO (US)

( * ) Notice: Subject to any disclaimer, the term of this patent is extended or adjusted under 35 U.S.C. 154(b) by 98 days.

(21) Appl. No.: 16/431,547

(22) Filed: Jun. 4, 2019

(65) Prior Publication Data

US 2020/0383688 A1    Dec. 10, 2020

(51) Int. Cl.
*A61B 17/12* (2006.01)
*A61B 5/00* (2006.01)
(Continued)

(52) U.S. Cl.
CPC ...... *A61B 17/12109* (2013.01); *A61B 5/0215* (2013.01); *A61B 17/1204* (2013.01);
(Continued)

(58) Field of Classification Search
CPC .......... A61B 17/12177; A61B 17/1204; A61B 17/12022; A61B 17/12109;
(Continued)

(56) References Cited

U.S. PATENT DOCUMENTS

| 3,551,556 A | 12/1970 | Kliment |
|---|---|---|
| 3,946,734 A | 3/1976 | Derick |

(Continued)

FOREIGN PATENT DOCUMENTS

| CN | 101449987 A | 6/2009 |
|---|---|---|
| CN | 103260547 A | 8/2013 |

(Continued)

OTHER PUBLICATIONS

US 7,169,126 B2, 01/2007, Zadno-Azizi (withdrawn)
(Continued)

*Primary Examiner* — Scott J Medway
(74) *Attorney, Agent, or Firm* — Wan Chieh Lee; Trenton D. Hatherill; Haug Partners LLP

(57) ABSTRACT

An atraumatic vessel occlusive system includes a flexible tubular member with an infusion lumen, a vessel occluder mounted at the distal end of the tubular member, and a pressure sensor located within a chamber defined by the occluder. The occluder has a braided construct provided with a fluid impermeable membrane over its proximal portion and a fluid permeable covering over its distal portion. The pressure sensor is adapted to sense pressure within the vessel through the fluid permeable membrane without being subject to the effects of turbulent flow at the exit of the infusion lumen. The accurately sensed pressure can be used to determine a dwell time for the occluder.

22 Claims, 3 Drawing Sheets

(51) Int. Cl.
  *A61B 5/02* (2006.01)
  *A61B 5/0215* (2006.01)
  *A61M 25/00* (2006.01)
  *A61M 25/09* (2006.01)
  *A61M 25/10* (2013.01)

(52) U.S. Cl.
  CPC ....... *A61B 17/12136* (2013.01); *A61M 25/09* (2013.01); *A61M 25/10181* (2013.11); *A61B 5/02007* (2013.01); *A61B 5/6853* (2013.01); *A61B 2017/1205* (2013.01); *A61M 2025/0002* (2013.01); *A61M 2025/09008* (2013.01)

(58) Field of Classification Search
  CPC ........ A61B 17/12136; A61B 17/12036; A61B 17/12031; A61M 2025/0002; A61M 25/104; A61M 25/10
  See application file for complete search history.

(56) References Cited

U.S. PATENT DOCUMENTS

| | | | |
|---|---|---|---|
| 4,261,341 A | 4/1981 | Hakim | |
| 4,311,587 A | 1/1982 | Nose | |
| 4,655,771 A | 4/1987 | Wallsten | |
| 4,714,460 A | 12/1987 | Calderon | |
| 4,738,740 A | 4/1988 | Pinchuk | |
| 4,800,016 A | 1/1989 | Yang | |
| 4,840,542 A | 6/1989 | Abbott | |
| 4,883,459 A | 11/1989 | Calderon | |
| 4,892,518 A | 1/1990 | Cupp | |
| 5,024,668 A | 6/1991 | Peters | |
| 5,030,199 A | 7/1991 | Barwick | |
| 5,071,407 A | 12/1991 | Termin | |
| 5,084,015 A | 1/1992 | Moriuchi | |
| 5,171,299 A * | 12/1992 | Heitzmann | A61M 25/10188 604/920 |
| 5,234,425 A | 8/1993 | Fogarty | |
| 5,397,307 A | 3/1995 | Goodin | |
| 5,397,308 A * | 3/1995 | Ellis | A61M 25/10181 604/920 |
| 5,411,478 A | 5/1995 | Stillabower | |
| 5,419,763 A | 5/1995 | Hildebrand | |
| 5,484,399 A | 1/1996 | Diresta | |
| 5,484,412 A | 1/1996 | Pierpont | |
| 5,496,277 A | 3/1996 | Termin | |
| 5,599,301 A | 2/1997 | Jacobs et al. | |
| 5,607,466 A | 3/1997 | Imbert | |
| 5,668,237 A | 9/1997 | Popall | |
| 5,688,237 A | 11/1997 | Rozga | |
| 5,725,571 A | 3/1998 | Imbert | |
| 5,755,687 A | 5/1998 | Donlon | |
| 5,755,769 A | 5/1998 | Richard | |
| 5,759,205 A | 6/1998 | Valentini | |
| 5,795,325 A | 8/1998 | Valley et al. | |
| 5,810,789 A | 9/1998 | Powers | |
| 5,836,905 A | 11/1998 | Lemelson | |
| 5,836,967 A | 11/1998 | Schneider | |
| 5,893,869 A | 4/1999 | Barnhart | |
| 5,895,399 A | 4/1999 | Barbut | |
| 5,897,567 A | 4/1999 | Ressemann | |
| 5,910,154 A | 6/1999 | Tsugita | |
| 5,911,734 A | 6/1999 | Tsugita | |
| 5,957,974 A | 9/1999 | Thompson | |
| 6,001,118 A | 12/1999 | Daniel | |
| 6,010,522 A | 1/2000 | Barbut | |
| 6,027,520 A | 2/2000 | Tsugita | |
| 6,042,598 A | 3/2000 | Tsugita | |
| 6,051,014 A | 4/2000 | Jang | |
| 6,059,745 A | 5/2000 | Gelbfish | |
| 6,152,946 A | 11/2000 | Broome | |
| 6,165,199 A | 12/2000 | Barbut | |
| 6,165,200 A | 12/2000 | Tsugita | |
| 6,168,579 B1 | 1/2001 | Tsugita | |
| 6,179,851 B1 | 1/2001 | Barbut | |
| 6,231,551 B1 | 5/2001 | Barbut | |
| 6,235,044 B1 | 5/2001 | Root | |
| 6,258,120 B1 | 7/2001 | McKenzie | |
| 6,306,074 B1 | 10/2001 | Waksman | |
| 6,306,163 B1 | 10/2001 | Fitz | |
| 6,309,399 B1 | 10/2001 | Barbut | |
| 6,361,545 B1 | 3/2002 | Macoviak | |
| 6,371,969 B1 | 4/2002 | Tsugita | |
| 6,371,971 B1 | 4/2002 | Tsugita | |
| 6,383,206 B1 | 5/2002 | Gillick | |
| 6,395,014 B1 | 5/2002 | Macoviak | |
| 6,416,495 B1 | 7/2002 | Kriesel | |
| 6,436,112 B2 | 8/2002 | Wensel | |
| 6,443,926 B1 | 9/2002 | Kletschka | |
| 6,478,783 B1 | 11/2002 | Moorehead | |
| 6,485,456 B1 | 11/2002 | Kletschka | |
| 6,485,502 B2 | 11/2002 | Don Michael | |
| 6,499,487 B1 | 12/2002 | McKenzie | |
| 6,500,203 B1 | 12/2002 | Thompson | |
| 6,520,183 B2 | 2/2003 | Amar | |
| 6,530,935 B2 | 3/2003 | Wensel | |
| 6,533,800 B1 | 3/2003 | Barbut | |
| 6,537,294 B1 | 3/2003 | Boyle | |
| 6,537,297 B2 | 3/2003 | Tsugita | |
| 6,540,722 B1 | 4/2003 | Boyle | |
| 6,551,303 B1 | 4/2003 | Van Tassel | |
| 6,565,552 B1 | 5/2003 | Barbut | |
| 6,569,146 B1 | 5/2003 | Werner | |
| 6,582,396 B1 | 6/2003 | Parodi | |
| 6,589,264 B1 | 7/2003 | Barbut | |
| 6,592,546 B1 | 7/2003 | Barbut | |
| 6,607,506 B2 | 8/2003 | Kletschka | |
| 6,620,148 B1 | 9/2003 | Tsugita | |
| 6,635,070 B2 | 10/2003 | Leeflang | |
| 6,641,553 B1 | 11/2003 | Chee | |
| 6,641,572 B2 | 11/2003 | Cherkassky | |
| 6,645,220 B1 | 11/2003 | Huter | |
| 6,645,222 B1 | 11/2003 | Parodi | |
| 6,645,223 B2 | 11/2003 | Boyle | |
| 6,652,555 B1 | 11/2003 | VanTassel | |
| 6,652,556 B1 | 11/2003 | VanTassel | |
| 6,656,351 B2 | 12/2003 | Boyle | |
| 6,673,090 B2 | 1/2004 | Root | |
| 6,676,682 B1 | 1/2004 | Tsugita | |
| 6,689,150 B1 | 2/2004 | VanTassel | |
| 6,692,508 B2 | 2/2004 | Wensel | |
| 6,692,509 B2 | 2/2004 | Wensel | |
| 6,692,513 B2 | 2/2004 | Streeter | |
| 6,695,813 B1 | 2/2004 | Boyle | |
| 6,695,858 B1 | 2/2004 | Dubrul | |
| 6,699,231 B1 | 3/2004 | Sterman | |
| 6,702,834 B1 | 3/2004 | Boylan | |
| 6,706,053 B1 | 3/2004 | Boylan | |
| 6,706,055 B2 | 3/2004 | Douk | |
| 6,730,108 B2 | 5/2004 | VanTassel | |
| 6,743,196 B2 * | 6/2004 | Barbut | A61M 25/003 604/96.01 |
| 6,746,469 B2 | 6/2004 | Mouw | |
| 6,746,489 B2 | 6/2004 | Dua | |
| 6,802,317 B2 | 10/2004 | Goebel | |
| 6,818,006 B2 | 11/2004 | Douk | |
| 6,830,579 B2 | 12/2004 | Barbut | |
| 6,837,898 B2 | 1/2005 | Boyle | |
| 6,855,154 B2 | 2/2005 | Abdel-Gawwad | |
| 6,866,677 B2 | 3/2005 | Douk | |
| 6,887,238 B2 | 5/2005 | Jahns | |
| 6,887,258 B2 | 5/2005 | Denison | |
| 6,896,690 B1 | 5/2005 | Lambrecht | |
| 6,902,540 B2 | 6/2005 | Dorros | |
| 6,908,474 B2 | 6/2005 | Hogendijk | |
| 6,911,036 B2 | 6/2005 | Douk | |
| 6,929,633 B2 | 8/2005 | Evans et al. | |
| 6,936,060 B2 | 8/2005 | Hogendijk | |
| 6,939,362 B2 | 9/2005 | Boyle | |
| 6,964,670 B1 | 11/2005 | Shah | |
| 6,964,673 B2 | 11/2005 | Tsugita | |
| 6,974,469 B2 | 12/2005 | Broome | |
| 6,989,027 B2 | 1/2006 | Allen | |
| 6,997,898 B2 | 2/2006 | Forman | |

(56) References Cited

U.S. PATENT DOCUMENTS

| | | | |
|---|---|---|---|
| 7,044,958 B2 | 5/2006 | Douk |
| 7,044,966 B2 | 5/2006 | Svanidze |
| 7,066,946 B2 | 6/2006 | Douk |
| 7,101,396 B2 | 9/2006 | Artof |
| 7,108,680 B2 | 9/2006 | Rohr et al. |
| 7,118,600 B2 | 10/2006 | Dua |
| 7,162,303 B2 | 1/2007 | Levin |
| 7,169,164 B2 | 1/2007 | Borillo |
| 7,172,614 B2 | 2/2007 | Boyle |
| 7,172,621 B2 | 2/2007 | Theron |
| 7,214,237 B2 | 5/2007 | Don Michael |
| 7,217,255 B2 | 5/2007 | Boyle |
| 7,223,253 B2 | 5/2007 | Hogendijk |
| 7,232,452 B2 | 6/2007 | Adams |
| 7,232,453 B2 | 6/2007 | Shimon |
| 7,241,304 B2 | 7/2007 | Boyle |
| 7,250,041 B2 | 7/2007 | Chiu |
| 7,252,675 B2 | 8/2007 | Denison |
| 7,279,000 B2 | 10/2007 | Cartier |
| 7,306,575 B2 | 12/2007 | Barbut |
| 7,322,957 B2 | 1/2008 | Kletschka |
| 7,326,226 B2 | 2/2008 | Root |
| 7,331,973 B2 | 2/2008 | Gesswein |
| 7,338,510 B2 | 3/2008 | Boylan |
| 7,344,549 B2 | 3/2008 | Boyle |
| 7,364,566 B2 | 4/2008 | Elkins |
| 7,371,249 B2 | 5/2008 | Douk |
| 7,425,215 B2 | 9/2008 | Boyle |
| 7,452,532 B2 | 11/2008 | Alt et al. |
| 7,503,904 B2 | 3/2009 | Choi |
| 7,537,600 B2 | 5/2009 | Eskuri |
| 7,544,202 B2 | 6/2009 | Cartier |
| 7,572,272 B2 | 8/2009 | Denison |
| 7,582,100 B2 | 9/2009 | Johnson |
| 7,585,309 B2 | 9/2009 | Larson |
| 7,591,832 B2 | 9/2009 | Eversull |
| 7,604,650 B2 | 10/2009 | Bergheim |
| 7,647,115 B2 | 1/2010 | Levin |
| 7,653,438 B2 | 1/2010 | Deem |
| 7,658,747 B2 | 2/2010 | Forde |
| 7,686,781 B2 | 3/2010 | Vinten-Johansen |
| 7,833,242 B2 | 11/2010 | Gilson |
| 7,842,084 B2 | 11/2010 | Bicer |
| 7,846,139 B2 | 12/2010 | Zinn |
| 7,853,333 B2 | 12/2010 | Demarais |
| 7,873,417 B2 | 1/2011 | Demarais |
| 7,922,691 B2 | 4/2011 | Kletchka |
| 7,935,075 B2 * | 5/2011 | Tockman ............... A61N 1/057 |
| | | 604/101.02 |
| 7,937,143 B2 | 5/2011 | Demarais |
| 7,938,799 B2 | 5/2011 | Epstein |
| 7,993,324 B2 | 8/2011 | Barbut |
| 8,088,103 B2 | 1/2012 | Tesslink et al. |
| 8,162,879 B2 | 4/2012 | Hattangadi |
| 8,172,792 B2 | 5/2012 | Wang |
| 8,182,446 B2 | 5/2012 | Schaeffer |
| 8,185,186 B2 | 5/2012 | Ross et al. |
| 8,200,312 B2 | 6/2012 | Degani |
| 8,251,948 B2 | 8/2012 | Goldman |
| 8,257,384 B2 | 9/2012 | Bates |
| 8,262,611 B2 | 9/2012 | Teesllink |
| 8,397,578 B2 | 3/2013 | Miesel |
| 8,409,166 B2 | 4/2013 | Wiener |
| 8,500,775 B2 | 8/2013 | Chomas |
| 8,696,698 B2 | 4/2014 | Chomas |
| 8,696,699 B2 | 4/2014 | Chomas |
| 8,821,476 B2 | 9/2014 | Agah |
| 8,852,207 B2 | 10/2014 | Simpson |
| 9,023,010 B2 | 5/2015 | Chiu |
| 9,061,117 B2 | 6/2015 | Roberts |
| 9,078,982 B2 | 7/2015 | Lane |
| 9,089,341 B2 | 7/2015 | Chomas |
| 9,126,016 B2 | 9/2015 | Chomas |
| 9,174,020 B2 | 11/2015 | Allen |
| 9,205,226 B2 | 12/2015 | Allen |
| 9,265,914 B2 | 2/2016 | Fulton, III |
| 9,364,358 B2 | 6/2016 | Cohen |
| 9,457,171 B2 | 10/2016 | Agah |
| 9,463,304 B2 | 10/2016 | Agah |
| 9,474,533 B2 | 10/2016 | Mathis |
| 9,539,081 B2 | 1/2017 | Chomas |
| 9,550,046 B1 | 1/2017 | Allen |
| 9,597,480 B2 | 3/2017 | Purdy |
| 9,604,037 B2 | 3/2017 | Fischer, Jr. |
| 9,737,693 B2 * | 8/2017 | Helkowski ...... A61M 25/10184 |
| 9,770,319 B2 | 9/2017 | Pinchuk |
| 9,808,332 B2 | 11/2017 | Chomas |
| 9,844,383 B2 | 12/2017 | Allen |
| 9,913,959 B2 | 3/2018 | Purdy |
| 9,968,740 B2 | 5/2018 | Pinchuk |
| 10,092,742 B2 | 10/2018 | Genstler |
| 10,099,040 B2 | 10/2018 | Agah |
| 10,130,762 B2 | 11/2018 | Allen |
| 10,279,094 B2 * | 5/2019 | Williams ............ A61M 60/295 |
| 10,368,872 B2 | 8/2019 | Franklin et al. |
| 10,512,761 B2 * | 12/2019 | Agah ................ A61M 25/1011 |
| 11,090,460 B2 | 8/2021 | Jaroch |
| 11,090,468 B2 | 8/2021 | Chappa |
| 11,241,238 B2 | 2/2022 | Mohl |
| 11,324,619 B1 * | 5/2022 | Yacoby ..................... A61F 2/07 |
| 11,400,263 B1 | 8/2022 | Arepally |
| 11,633,192 B2 | 4/2023 | Johnson et al. |
| 11,744,692 B2 * | 9/2023 | Farago ............ A61B 17/12109 |
| | | 604/509 |
| 11,806,457 B2 | 11/2023 | Gerber et al. |
| 12,290,564 B2 | 5/2025 | Agah et al. |
| 2001/0041862 A1 | 11/2001 | Glickman |
| 2002/0042593 A1 | 4/2002 | Mickley |
| 2002/0161390 A1 | 10/2002 | Mouw |
| 2002/0161394 A1 | 10/2002 | Macoviak |
| 2002/0165582 A1 | 11/2002 | Porter |
| 2003/0097114 A1 | 5/2003 | Duriel |
| 2003/0125790 A1 | 7/2003 | Fastovsky |
| 2003/0187474 A1 | 10/2003 | Keegan |
| 2003/0212361 A1 | 11/2003 | Boyle |
| 2003/0233115 A1 | 12/2003 | Eversull |
| 2004/0006305 A1 | 1/2004 | Hebert |
| 2004/0054315 A1 | 3/2004 | Levin |
| 2004/0068288 A1 | 4/2004 | Palmer |
| 2004/0143185 A1 | 7/2004 | Zatezalo |
| 2004/0215142 A1 | 10/2004 | Matheis |
| 2004/0220511 A1 | 11/2004 | Scott |
| 2004/0220521 A1 | 11/2004 | Barbut |
| 2004/0220609 A1 | 11/2004 | Douk |
| 2004/0225354 A1 | 11/2004 | Allen |
| 2004/0256584 A1 | 12/2004 | Zimmerling |
| 2004/0260333 A1 | 12/2004 | Dubral |
| 2005/0004517 A1 | 1/2005 | Courtney |
| 2005/0010285 A1 | 1/2005 | Lambrecht |
| 2005/0015048 A1 * | 1/2005 | Chiu ..................... A61M 25/10 |
| | | 604/101.04 |
| 2005/0015112 A1 | 1/2005 | Cohn |
| 2005/0113798 A1 | 5/2005 | Slater |
| 2005/0119688 A1 | 6/2005 | Burgheim |
| 2005/0124971 A1 | 6/2005 | Koch et al. |
| 2005/0148997 A1 | 7/2005 | Valley et al. |
| 2005/0149112 A1 | 7/2005 | Barbut |
| 2005/0226855 A1 | 10/2005 | Alt et al. |
| 2005/0261759 A1 | 11/2005 | Lambrecht |
| 2006/0124140 A1 | 6/2006 | Forsell |
| 2006/0167537 A1 | 7/2006 | Larsson |
| 2006/0173490 A1 | 8/2006 | LaFontaine |
| 2006/0177478 A1 | 8/2006 | Humes |
| 2006/0178695 A1 | 8/2006 | Decant, Jr. et al. |
| 2006/0263301 A1 | 11/2006 | Vernon |
| 2006/0264898 A1 | 11/2006 | Beasley |
| 2007/0106258 A1 | 5/2007 | Chiu |
| 2007/0106324 A1 | 5/2007 | Gamer |
| 2007/0129752 A1 | 6/2007 | Webler et al. |
| 2007/0179590 A1 | 8/2007 | Lu |
| 2007/0186932 A1 | 8/2007 | Wondka et al. |
| 2007/0239135 A9 | 10/2007 | Barbut |
| 2008/0031740 A1 | 2/2008 | Miyazaki |
| 2008/0031962 A1 | 2/2008 | Boyan |

(56) References Cited

U.S. PATENT DOCUMENTS

| | | |
|---|---|---|
| 2008/0033341 A1 | 2/2008 | Grad |
| 2008/0039786 A1 | 2/2008 | Epstein |
| 2008/0051758 A1 | 2/2008 | Rioux |
| 2008/0097273 A1 | 4/2008 | Levin |
| 2008/0103523 A1 | 5/2008 | Chiu |
| 2008/0147007 A1 | 6/2008 | Freyman |
| 2008/0194996 A1 | 8/2008 | Kassab et al. |
| 2008/0234796 A1 | 9/2008 | Dorn |
| 2009/0012444 A1 | 1/2009 | Shuros et al. |
| 2009/0012469 A1 | 1/2009 | Nita |
| 2009/0018498 A1 | 1/2009 | Chiu |
| 2009/0076409 A1 | 3/2009 | Wu |
| 2009/0088676 A1 | 4/2009 | Murata |
| 2009/0177183 A1 | 7/2009 | Pinkernell et al. |
| 2009/0198321 A1 | 8/2009 | Sutermeister |
| 2009/0222035 A1 | 9/2009 | Schneiderman |
| 2009/0234266 A1 | 9/2009 | Solomon |
| 2009/0234283 A1 | 9/2009 | Burton |
| 2009/0264819 A1 | 10/2009 | Diethrich |
| 2010/0168649 A1 | 7/2010 | Schwartz et al. |
| 2010/0168785 A1 | 7/2010 | Parker |
| 2010/0331815 A1 | 12/2010 | Alt |
| 2011/0046542 A1 | 2/2011 | Evans |
| 2011/0130657 A1 | 6/2011 | Chomas |
| 2011/0137399 A1 | 6/2011 | Chomas |
| 2011/0218494 A1 | 9/2011 | Gerrans |
| 2011/0288529 A1 | 11/2011 | Fulton |
| 2011/0295114 A1 | 12/2011 | Agah |
| 2011/0295203 A1 | 12/2011 | Hayes |
| 2011/0313318 A1 | 12/2011 | Rule |
| 2012/0116351 A1 | 5/2012 | Chomas |
| 2012/0259206 A1 | 10/2012 | Roberts |
| 2013/0079731 A1 | 3/2013 | Chomas |
| 2013/0116655 A1 | 5/2013 | Bacino |
| 2013/0197418 A1 | 8/2013 | Angheloiu et al. |
| 2013/0226166 A1 | 8/2013 | Chomas |
| 2014/0052224 A1 | 2/2014 | Kassab et al. |
| 2014/0066830 A1 | 3/2014 | Lad |
| 2014/0073536 A1 | 3/2014 | Lin |
| 2014/0207178 A1 | 7/2014 | Chomas |
| 2014/0276135 A1 | 9/2014 | Agah |
| 2014/0364835 A1 | 12/2014 | Allen |
| 2014/0378951 A1 | 12/2014 | Dye |
| 2015/0272716 A1 | 10/2015 | Pinchuk |
| 2015/0306311 A1 | 10/2015 | Pinchuk |
| 2016/0015948 A1 | 1/2016 | Agah |
| 2016/0045316 A1* | 2/2016 | Braido ................. A61B 5/6847 623/2.38 |
| 2016/0074633 A1 | 3/2016 | Schaffner |
| 2016/0082178 A1 | 3/2016 | Agah |
| 2016/0199544 A1 | 7/2016 | Lee |
| 2016/0206798 A1* | 7/2016 | Williams .............. A61M 60/50 |
| 2016/0235942 A1 | 8/2016 | Alt |
| 2016/0235950 A1 | 8/2016 | Murata |
| 2016/0249969 A1* | 9/2016 | Santoinanni et al. . A61B 18/02 606/24 |
| 2016/0256626 A9 | 9/2016 | Chomas |
| 2016/0310148 A1* | 10/2016 | Allen ................. A61B 17/1204 |
| 2017/0000493 A1 | 1/2017 | Boehm, Jr. |
| 2017/0049946 A1 | 2/2017 | Kapur |
| 2017/0050002 A1 | 2/2017 | Steffen |
| 2017/0056629 A1 | 3/2017 | Agah |
| 2017/0166598 A1 | 6/2017 | Huang |
| 2017/0173309 A1 | 6/2017 | Fischer, Jr. |
| 2017/0189654 A1 | 7/2017 | Schwartz |
| 2017/0209666 A1 | 7/2017 | Quigley |
| 2017/0319820 A1 | 11/2017 | Johnson |
| 2017/0368306 A1 | 12/2017 | Tal |
| 2018/0055620 A1 | 3/2018 | Chomas |
| 2018/0116522 A1 | 5/2018 | Brenneman |
| 2018/0125502 A1 | 5/2018 | Allen |
| 2018/0250456 A1 | 9/2018 | Nitzan et al. |
| 2018/0250469 A1 | 9/2018 | Pinchuk |
| 2018/0263752 A1* | 9/2018 | Pinchuk et al. . A61B 17/12177 |
| 2018/0289464 A1 | 10/2018 | Kassab |
| 2018/0315183 A1 | 11/2018 | Milioni De Carvalho |
| 2018/0333563 A1 | 11/2018 | Agah |
| 2019/0015630 A1 | 1/2019 | Franklin et al. |
| 2019/0046157 A1 | 2/2019 | Unser |
| 2019/0083705 A1* | 3/2019 | Allen ................. A61B 17/1204 |
| 2020/0038586 A1 | 2/2020 | Chomas |
| 2020/0078555 A1 | 3/2020 | Agah |
| 2020/0108239 A1 | 4/2020 | Arepally |
| 2020/0197720 A1 | 6/2020 | Otsu et al. |
| 2020/0205840 A1* | 7/2020 | Adawi ............. A61B 17/12177 |
| 2020/0261695 A1 | 8/2020 | Jaroch |
| 2020/0345976 A1 | 11/2020 | Kalt |
| 2020/0383688 A1 | 12/2020 | Olson |
| 2021/0244473 A1* | 8/2021 | Cook ................ A61B 17/22022 |
| 2021/0338976 A1 | 11/2021 | Jaroch |
| 2022/0296809 A1 | 9/2022 | Katsnelson |
| 2024/0090902 A1* | 3/2024 | Tal ................... A61B 17/12172 |

FOREIGN PATENT DOCUMENTS

| | | |
|---|---|---|
| CN | 203107204 U | 8/2013 |
| CN | 105007973 A | 10/2015 |
| CN | 105208946 A | 12/2015 |
| CN | 108778149 A | 11/2018 |
| CN | 208388680 U | 1/2019 |
| DE | 8910603 U1 | 12/1989 |
| EP | 0249338 A | 12/1987 |
| EP | 0416662 B1 | 3/1991 |
| EP | 0533511 A1 | 3/1993 |
| EP | 0554579 A1 | 8/1993 |
| EP | 1226795 | 7/2002 |
| EP | 1527740 | 5/2005 |
| EP | 1743524 | 1/2007 |
| EP | 1803423 | 7/2007 |
| EP | 2359893 A1 | 6/2011 |
| FR | 2652267 A1 | 3/1991 |
| GB | 2020557 B | 11/1979 |
| JP | 2006051144 A | 2/2006 |
| JP | 2006523515 | 10/2006 |
| WO | 8905667 | 6/1989 |
| WO | 199902093 A1 | 1/1999 |
| WO | 199916382 | 4/1999 |
| WO | 199944510 A1 | 9/1999 |
| WO | 200051675 A1 | 9/2000 |
| WO | 200141679 | 6/2001 |
| WO | 200145592 | 6/2001 |
| WO | 200149215 A2 | 7/2001 |
| WO | 0197879 | 12/2001 |
| WO | 2002055146 A1 | 7/2002 |
| WO | 2004043293 | 5/2004 |
| WO | 2004075776 A2 | 9/2004 |
| WO | 2005082447 A2 | 9/2005 |
| WO | 2011068946 | 6/2011 |
| WO | 2015148284 A1 | 10/2015 |
| WO | 2015187196 A1 | 12/2015 |
| WO | 2016149653 A2 | 9/2016 |
| WO | 2017004019 A1 | 1/2017 |
| WO | 2018175148 A1 | 9/2018 |
| WO | 2019140381 | 7/2019 |

OTHER PUBLICATIONS

International Search Report and Written Opinion of Application No. PCT/US2020/034626 dated Aug. 26, 2020.

Allogenic Chimeric Antigen Receptor-Modified Cells for Adoptive Cell Therapy of Cancer, Marcus, Assaf et al., Mar. 24, 2014, Expert Opinion of Biological Therapy, vol. 14, Issue 7.

A Study of the Geometrical and Mechanical Properties of a Self-Expandig Metallic Stent Theory and Experiment, Dr. Michael R. Jedwab, Claude 0. CLERC, Journal of Applied Biomaterials, vol. 4, Issue 1, pp. 77-85, Spring 1993.

U.S. Appl. No. 61/266,068, filed Dec. 2, 2009, Chomas et al.

U.S. Appl. No. 61/382,290, filed Sep. 13, 2010, Chomas et al.

Cannulation of the Cardiac Lymphatic Sytem in Swine, Vazquez-Jiminez et al., European Journal of Cardio-thoracic Surgery 18 (2000) 223-232.

(56) References Cited

OTHER PUBLICATIONS

Catheter-Based Renal Sympathetic Denervation for Resistant Hypertension: a Multicentre Safety and Proof-of-Principle Cohort Study, Krum et al., The Lancet, 2009.
Development of Repeatable Microcatheter Access Port for Intra-arterial Therapy of Liver Cancer, Yasushi Fukuoka et al., Cardiovasc Intervent Radiol (2019) 42:298-303.
Embolization II, Scientific Session 11, JVIR, Mar. 27, 2012.
Embolization procedure lowers levels of "hunger hormone," leads to weight loss, EurekAlert Public Release, Mar. 7, 2013.
Estimation of Tumor Interstitial Fluid Pressure (TIFP) Noninvasively, Long Lian Liu et al., PLOS One | DOI:10.1371/journal.pone.0140892 Jul. 28, 2016.
Finite Element Stent Design, M. De Beule, R. Van Impe, P. Verdonck, B. Verhegghe, Computer Methods in Biomechanics and Biomedical Engineering, 2005.
First-In-Man Study of Left Gastric Artery Embolization for Weight Loss, Nicholas Kipshidze et al., ACC.13, E2056, UACC Mar. 12, 2013, vol. 61, Issue 10.
Fusion Drug Delivery System-Novel Catheter/Stent Design for Targeted Drug Delivery, Gerschwind & Barnett, Non-Published US provisional patent application filed Sep. 17, 2007.
International Search Report and Written Opinion of Application No. PCT/US16/23723 dated Sep. 2, 2016.
International Search Report and Written Opinion of Application No. PCT/US19/13482 dated Jun. 10, 2019.
International Search Report of PCT/US18/22171 dated Aug. 3, 2018.
Left Gastric Embolization Leads to Weight Loss, Bariatriac News, Owen Haskins, Dec. 4, 2013.
Long-Term Catheterization of the Intestinal Lymph Trunk and Collection of Lymph in Neonatal Pigs, Richard R. Uwiera et al., Journal of Visualized Experiments, Mar. 2016, 109, e53457.
Lymphaniography to Treat Postoperative Lymphatic Leakage: A Technical Review, Edward Wolfgang Lee, et al., Korean Journal of Radiology 15(6), Nov./Dec. 2014.
Radiologic Placement of Side-hole Catheter with Tip Fixation for Hepatic Arterial Infusion Chemotherapy, Toshihiro Tanaka et al., J Vasc Interv Radiol 2003: 14:63-68.
Renal Denervation as a Therapeutic Approach for Hypertension: Novel Implications for an Old Concept, Schlaich et al., Hypertension, Journal of the American Heart Association, 2009, 54:1195-1201.
Renal Sympathetic-Nerve Ablation for Uncontrolled Hypertension, Schlaich et al., The New England Journal of Medicine, 2009, pp. 932-934, Aug. 27, 2009.
RenovoCath(tm) RC120 The Future of Targeted Delivery, RenovoRx Inc., web brochure downloaded from Internet on Feb. 2, 2015.
Superselective Retrograde Lymphatic Duct Embolization for Management of Postoperataive Lymphatic Leak, Bulent Arslan et al., Diagn Interv Radiol 2017; 23:379-380.
Canadian Office Action 2 dated Jun. 3, 2022 of Application No. 3,139,118.
Japanese Office Action dated May 10, 2022 of Application No. 2021-572025.
U.S. Appl. No. 17/375,779, filed Jul. 14, 2021, Arepally et al.
U.S. Appl. No. 17/671,296, filed Feb. 14, 2022, Arepally et al.
Chinese Office Action and Search Report dated Jan. 10, 2022 of Application No. 201980016342.3.
EP Search Report and Written Opinion of Application No. EP19739019 dated Sep. 17, 2021.
Japanese Office Action dated Apr. 28, 2021 of Application No. 2020-082002.
Search Report and Written Opinion of Application No. PCT/US 19/54406 dated Jan. 6, 2020.
Bertone, Joseph J. "Basic pharmacological principles." 2011. World Small Animal Veterinary Association World Congress Proceedings. < https://www.vin.com/doc/?id=5189569> (Year: 2011).

* cited by examiner

ATRAUMATIC OCCLUSIVE SYSTEM WITH COMPARTMENT FOR MEASUREMENT OF VASCULAR PRESSURE CHANGE

BACKGROUND OF THE INVENTION

1. Field of the Invention

The present invention relates to catheter-based occlusive systems and intravascular methods to deliver a therapeutic agent for the treatment of disease.

2. State of the Art

Veins are designed to carry blood from the tissue back to the heart. This results in several physiological differences relative to the arteries. Key among these features is that they are configured to carry a relatively large volume of low-pressure blood. They therefore tend to have larger lumens and less muscle and elastic tissue relative to comparable arteries. Temporary occlusion of the vein therefore requires a device with large diameter sufficient to fill the venous channel without exerting high radial forces on the weaker vessel walls.

The most common occlusion device is the vascular balloon. These devices function by inflating a flexible or semi flexible membrane using fluid pressure through a lumen in communication with an operator. The inflation of the balloon to an appropriate size is typically monitored by fluoroscopy by injection of precise quantities of contrast fluid to inflate the balloon, followed by infusion of a bolus of contrast through the infusion lumen of the device to determine if blood flow persists. Balloon volume must be closely monitored as even small degrees of over inflation result in high radial force applied to the vessel wall.

In the arterial network, the use of balloons is common place. The structure of the arterial vessels, having a thick layer of muscle and elastic fiber matrix, allows for a high degree of variability in inflation of the device without rupture.

In distinction, the venous system presents a number of challenges when using balloons. The larger veins require larger balloon diameters, making precise control of inflation challenging. Furthermore, the weaker and less elastic structure of the vein is less resistant to the high radial force exerted by the balloon. This in turn results in complications such as vessel rupture and dissection.

Co-owned U.S. Pat. Nos. 9,770,319 and 9,968,740 to Chomas teach several therapeutic catheter-based dynamic microvalve occlusion systems that automatically open and close based on relative fluid pressure conditions about proximal and distal sides of the microvalve. These occlusive systems provide excellent occlusion while exerting low radial force on the vessel wall. However, the systems described in Chomas are not adapted to provide the user accurate information on the pressurization to which the treated vessels are subject or whether the interstitial fluid pressure in the treated tissue is overcome. In particular, the interstitial fluid surrounds and exerts pressure upon the vessels. The interstitial fluid pressure in a tumor is a physiological parameter with demonstrated predictive value for a tumor's aggressiveness, drug delivery, as well as response to treatments such as radiotherapy and chemotherapy. The interstitial fluid pressure is generally high relative to the blood pressure within the vein, indicating a strong inclination of molecules to flow from the interstitial fluid into the veins. Thus, the interstitial fluid pressure biases the vein against therapeutic uptake.

SUMMARY

An atraumatic vessel occlusive system includes a flexible tubular member having a proximal end, a distal end, and defining an infusing lumen extending between its proximal and distal ends, a diametrically adjustable vessel occluder mounted at the distal end, and at least one pressure sensor.

In an embodiment, the flexible tubular member includes an inner catheter longitudinally displaceable relative to an outer catheter. The inner catheter defines the infusion lumen with a distal orifice and a flush lumen is defined at least in part by the outer catheter and preferably between the inner and outer catheters.

In an embodiment, the occluder is coupled to the distal ends of each of the outer and inner catheters such that when the inner catheter is longitudinally displaced in a distal direction relative to the outer catheter, the occluder diametrically collapses into an elongate ovoid delivery configuration sized for passage through a vessel, and when the inner catheter is longitudinally displaced in a proximal direction relative to the outer catheter, the occluder diametrically expands into an occlusive configuration adapted to extend across the wall of the vessel. The expanded occlusive configuration defines a chamber within the occluder. The occluder has a fluid impermeable proximal portion and a fluid permeable distal portion that allows fluid communication between the vessel distal of the occluder and the chamber.

In accord with one aspect of the system, the structure of the occluder is formed as a microvalve of flexible braided filaments with low radial force that will not over-pressurize the wall of a vessel in which it is deployed. A fluid impermeable membrane is provided over the proximal portion of the braided construct. The distal portion of the braided construct is covered in a fluid permeable coating or covering.

In accord with an embodiment of the system, a first pressure senor is positioned within the chamber of the occluder. As a result of the fluid communication between the chamber and the vessel, the first pressure sensor is adapted to sense pressure in the vessel in real time. Further, because the first pressure sensor is shielded from the vessel by the fluid permeable membrane, the first pressure sensor is not subject to the effects of turbulent flow occurring at the distal orifice of the infusing lumen, as described further below.

During therapeutic agent delivery, pressure readings can be used to confirm placement of device and confirm absence of collateral flow in vessels distal to the tip of the device. Collateral flow is a condition in which circulation of blood is established through the enlargement of minor vessels and re-routing of vessels with those of adjacent parts when a vein or artery is functionally impaired. It can be important that no collateral flow exists to ensures that a fluidic therapeutic agent infused through infusion lumen of device will reach target tissue in the organ, and not be re-routed to non-target tissue. The change in pressure gradient running from the arterial to venous side is caused by the difference in volume within the vessels in the direction of flow. The arterial side has less volume than does the venous side, resulting in a pressure drop as blood flows from arteries to veins. The characteristic increase in pressure when a vein is occluded is an indicator that there is not collateralization of the tissue compartment, as collateral flow will offer an alternative path for blood flow and will prevent a pressure increase.

In accord with another aspect of the system, a second pressure sensor is positioned proximal to the diameter of the occluder. A gradient between the first and second pressure sensors can directly determine when pressure in the vessel increases relative to systemic pressure. The presence of both sensors allows for real time calculation of such gradient.

In accord with another aspect of the system, an actuation handle is provided at proximal ends of the inner and outer catheters to effect relative displacement thereof. In addition, a first port is provided at the handle in fluid communication with the inner catheter for delivering a first fluid into the infusion lumen and out into the vessel. A second port is also provided at the handle in fluid communication with the outer catheter for delivering a second fluid through the flush lumen, into the chamber, and out of the fluid permeable distal portion of the occluder.

In accord with a method, the system is advanced to a target vessel of an organ in accord with known procedures. In a preferred method, the device is tracked through the venous system in the delivery configuration. The first and/or second pressure sensors are utilized to obtain a systemic reference pressure. The handle is actuated to retract the inner catheter relative to the outer catheter and thereby deploy the occluder into the occlusive configuration within the vein, in which it has a squatter, ovoid shape with an expanded diameter. The occluder occludes venous flow as the pressure of the blood flow within the vein applies force against the distal side of the occluder.

Blood fills the chamber of the occluder through the fluid permeable coating or covering. Alternatively, a fluid is infused through the flush lumen to fill the chamber and flow out into the vessel, thus placing the chamber and vessel in fluid continuity. The first pressure sensor within the chamber of the occluder is then able to provide a constant pressure monitoring of the vessel on the distal side of the occluder.

A therapeutic agent is then infused through the infusion lumen and out of the distal orifice, beyond the occluder. Infusion of therapy proceeds while pressure is monitored, allowing a user to determine if over pressurization is experienced and if interstitial fluid pressure within the tissue of the organ is overcome. The infusion of therapy can create local eddy currents in the fluid near the tip of the device. While this could otherwise prevent accurate readings of pressure during infusion if the sensor is placed at the device tip, the sensor by being placed within the chamber is protected from such currents. The apertures in or permeability of the distal portion of the occluder allows for fluid communication between the chamber and the distal vascular compartment. During infusion, pressure in the distal vasculature and the chamber equalize due to the apertures in the distal membrane. However, these apertures are sufficiently small to dampen turbulence generated by the distal tip, allowing for stable pressure readings by the first sensor. The stable pressure readings permit accurately identifying the pressure at the arterial side of the occluder.

The second sensor, located proximal to the expanded occluder can be used to monitor systemic pressure during infusion. Using the data from the first and second sensors, it can be more directly determined when pressure distal of the occluder increases relative to systemic pressure. The presence of both sensors allows for real time calculation of pressure differentials, while a single tip based sensor requires determining a systemic reference point prior to device deployment and subsequent infusions.

Then, during infusion of a therapeutic agent, the pressure gradient between the arterial side of the vein (from the first pressure sensor) and the return venous side (from the second pressure sensor) is monitored. If the gradient identifies a higher pressure on the distal side, such indicates that there is not yet collateralization of the tissue compartments, as collateral flow will offer an alternative path for blood flow and will prevent such pressure gradient. Infusion of therapy proceeds while pressure is monitored, allowing the user to determine if over-pressurization is experienced and if interstitial fluid pressure within the tissue is overcome.

In addition, according to one aspect of the method, the therapeutic agent can be infused at a flow rate that will generate a vascular pressure gradient which increases therapeutic diffusion rate through the venous and capillary vasculature. A dwell function can be applied to optimize diffusion of the therapeutic agent into the tissue given a measured pressure gradient. The dwell time of the dwell function will depend on the therapeutic agent and the measured pressure gradient. The larger the measured pressure gradient, a shorter dwell time is required for optimal diffusion of the therapeutic agent into the tissue.

The occluder can remain expanded within the vessel for the duration of the dwell time until the therapy has been infused and therapeutic uptake to occur without being washed away in venous blood flow. The proximal handle is then actuated to collapse the occluder, and the system is then removed from the anatomy.

DETAILED DESCRIPTION OF THE PREFERRED EMBODIMENTS

With reference to the following description, the terms "proximal" and "distal" are defined in reference to a user of the device, with the term "proximal" being closer to the user's hand, and the term "distal" being further from the user such as to be located further within a body of the patient during use.

Apparatus and methods are described herein related to the use of a system to inject a therapeutic agent into a primary vessel communicating with a diseased tissue of an organ, for example, a tumor. For example, the tumor to be treated can be a solid tumor. In some cases, the tumor can be a cancerous tumor, such as a tumor specific to, by way of example only, cancer of the pancreas, kidney, liver, lung, or uterus.

As described herein, a treatment system is used to provide a therapeutic agent into a solid tumor by targeted infusion of the treatment into a region of tissue. The therapeutic agent is injected under relatively high pressure into a region of an organ or other defined area of tissue served by one or more feeder vessels.

Figure 1:
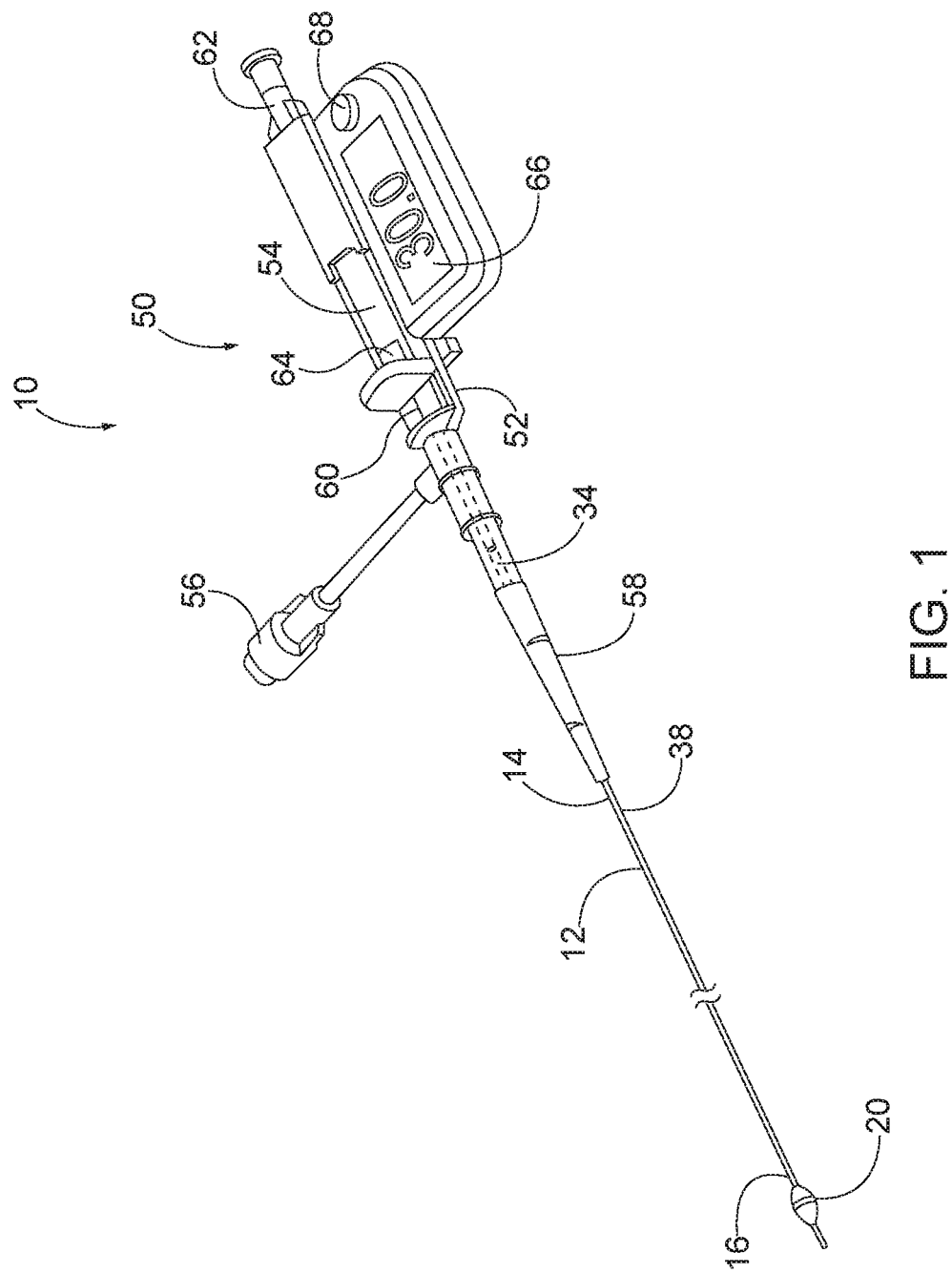
FIG. 1 is a perspective view of an atraumatic occlusive system as described in an embodiment herein.
Figure 2:
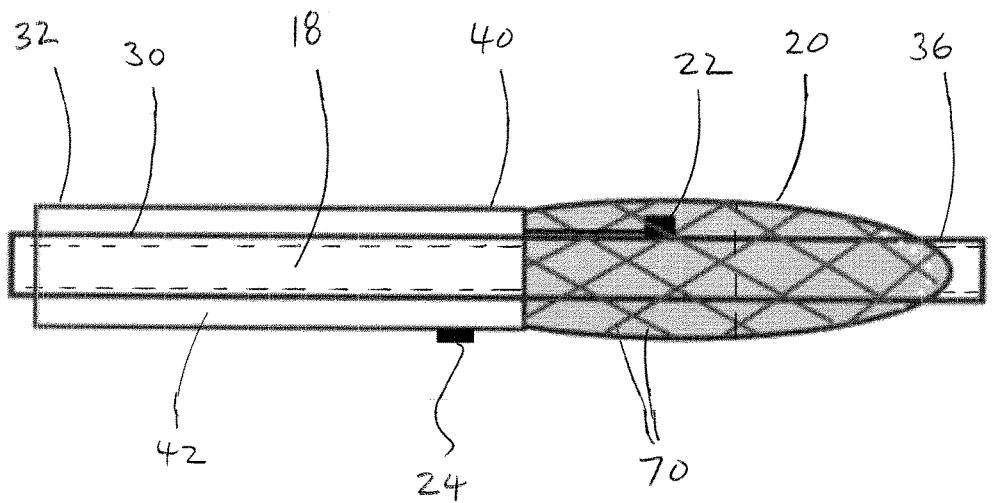
FIG. 2 is an enlarged schematic side elevation view of the distal side of the system of FIG. 1, shown with an occluder in a reduced diameter configuration for guidance to a target vessel.

Turning now to FIGS. 1 and 2, an atraumatic vessel occlusive system 10 is shown. The system 10 includes a flexible tubular member 12 having a proximal end 14 a distal end 16. The tubular member 12 defines an infusing lumen 18 extending between its proximal and distal ends. A diametrically adjustable vessel occluder 20 is mounted at the distal end 16 of the tubular member. The system also includes at least one pressure sensor 22, 24, located and functioning as described below.

In an embodiment, the flexible tubular member 12 includes an inner catheter 30 telescopically advanceable within an outer catheter 32. The inner catheter 30 has a proximal end 34 and distal end 36, and the outer catheter 32 also has a proximal end 38 and distal end 40. The infusion lumen 18 is preferably defined through the inner catheter 30 and opens to a distal axial orifice 84, and a separate flush lumen 42 is preferably defined in the toroidal space between the inner and outer catheters. Alternatively, the flush lumen may extend through the wall of either of the inner and outer catheters 30, 32.

In accord with a preferred aspect of the system, an actuation handle 50 is provided at the proximal ends 34, 38 of the inner and outer catheters 30, 32 to effect relative displacement thereof. The actuation handle 50 includes a stationary member 52 and a movable member 54, such as a slide longitudinally displaceable relative to the stationary member. The stationary member 52 is provided with a side port 56, and a strain relief 58 connects the proximal end 38 of the outer catheter 32 to the stationary member 52. The side port 56 is in fluid communication with the outer catheter 32. The movable slide 54 is coupled to the inner catheter 30. A hypotube 60 is coaxially inserted around the proximal end of the inner catheter 34 to provide mechanical support of the inner catheter. The proximal end of the slide 54 defines an infusion port 62 that is fluidly coupled to the proximal end 34 of the inner catheter 30. The actuation handle 50 also includes a releasable lock 64 that, when actuated, can retain the movable member 54 and stationary member 52 in relatively fixed longitudinal positions. The handle 50 may also include a display 66 and associated memory and logic to permit the display of real-time and/or stored pressure data read from the first and second sensors 22, 24, as well as calculated relationships between the pressures read from sensors 22, 24, such as a gradient between the two. Button 68 near display permits actuation of the logic and display as well as cycling through various logic functions.

Figure 3:
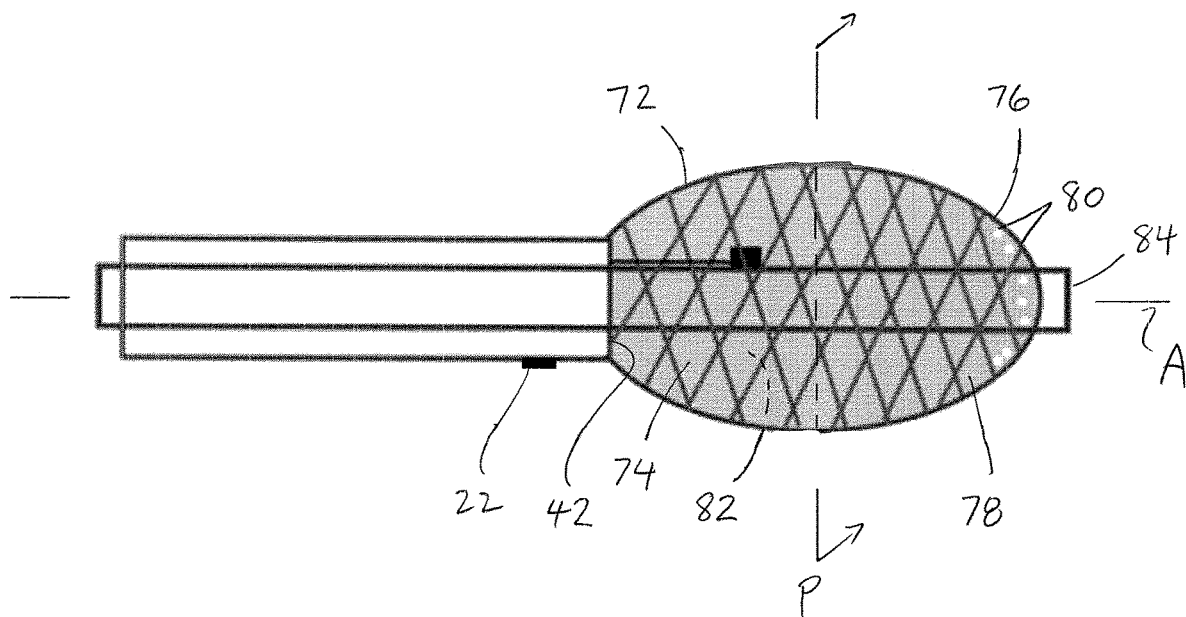
FIG. 3 is a view similar to FIG. 2, shown with the occluder in an enlarged diameter configuration for occlusion of the target vessel.

The occluder 20 is a microvalve comprising a braided construct of filaments 70. The proximal end of the filaments 70 are coupled to, and preferably rigidly fixed to, the distal end 40 of the outer catheter 32, and the distal end of the filaments 70 are coupled to, and preferably rigidly fixed to, the distal end 36 of the inner catheter 30. The general construct of the braided valve portion of such a microvalve device is described in detail in co-owned U.S. Pat. Nos. 8,696,698 and 9,770,319, both of which are hereby incorporated by reference herein in their entireties. Longitudinal displacement of the inner catheter 30 relative to the outer catheter 32 results in the microvalve moving between a first elongate ovoid configuration of smaller diameter (FIG. 2) adapted for guiding to a deployment location in a vessel, and a second squatter ovoid configuration of a larger diameter adapted for occlusion of the vessel (as shown in FIG. 3). That is, in both the first and second configurations, the microvalve is of an ovoid configuration and has a generally symmetrically shape about a longitudinal central axis A and a plane P orthogonal to the central axis A of the microvalve at its area of maximum diameter. It is recognized that the occluder can be moved through the first and second configurations, and any size of configuration therebetween to best suit the vessel in which it is used. The lock 64 on the handle 50 can facilitate retaining the occluder 20 in a desired size configuration during therapeutic treatment. The system 10 can be advanced in the first elongate configuration to a deployment location in a blood vessel over a guidewire (not shown) inserted through the infusion lumen 18 of the inner catheter 30. The interior of the occluder 20 defines a chamber 82.

In accord with one aspect of the occluder 20, a fluid impermeable membrane 72 is provided over the proximal portion 74 of the braided construct. Suitable materials for the impermeable membrane include elastomeric natural and artificial rubbers, silicones, styrenics, olefinics, copolyesters, polyurethanes and polyamides. In accord with another aspect of the occluder, a fluid permeable coating or covering 76 is provided over a distal portion 78 of the braided construct. Suitable materials for the fluid permeable coating 76 include elastomeric natural and artificial rubbers, silicones, styrenics, olefinics, copolyesters, polyurethanes and polyamides processed so as to have micro or macro scale perforations, channels, pores, or fibrous rather than continuous morphology. This may be accomplished by physical perforation techniques, by electrospinning or melt spinning fibers, by inclusion of soluble components that can be removed during processing to leave pores or voids, and by the addition of open pore foaming agents or other suitable technology. The coating or covering 76 can include a material placed over the outer surface of the filaments 70, within the inner surface of the filaments, or a combination thereof. The coating or covering 76 can extend only between the filaments. The coating or covering 76 can be free-floating on the filaments or can be rigidly fixed to the filaments. The coating or covering 76 can be applied by dip coating, spraying, sewing, bonded application, or other suitable technology. The fluid permeable material 76 can be an otherwise impermeable material made permeable by perforations or apertures 80. The fluid permeable material may be formed with interstices or openings 80 providing a permeability that meets the requirements of fluid permeability, as described below. The apertures, perforations, interstices, openings, etc. (collectively referred to hereinafter as 'apertures' 80) within the fluid permeable material may be geometrically arranged. The total cross-sectional surface area of the apertures should be sufficiently large so as to facilitate measurement of physiological response and infusion pressure while dampening short duration turbulent flow. Most preferably, apertures should be arranged in a radially symmetric fashion so as to maintain uniform radial bending properties of the device.

As the flush lumen between the inner catheter and outer catheter is in fluid communication with the proximal infusion port, a pressure sensor may reside within this space and still monitor pressure experienced at the distal tip as long as the proximal infusion port is sealed (creating a closed pressure chamber in communication with the distal tip of the catheter). Sensor responsiveness within this chamber is governed by the cross-sectional surface area of the flush lumen and by the length between the sensor and the distal-most aperture. The delay in pressure response time decreases with increasing cross-sectional area and decreasing length. For example, a device having a flush lumen with a cross-sectional area of 0.5 mm$^2$ and a sensor located 100 cm from the distal aperture will require 2-5 seconds to respond and stabilize to a change in pressure; whereas, a device having a flush lumen with a cross-sectional area of 0.5 mm$^2$ and a sensor located 50 cm from the distal aperture will require 1-3 seconds to respond and stabilize to a change in pressure; and whereas, a device having a flush lumen with a cross-sectional area of 2 mm² and a sensor located 100 cm from the distal aperture will require 0.1-0.5 seconds to respond and stabilize to a change in pressure. The proximity of the sensor is therefore governed by the duration of the physiological response intending to be monitored. For instance, the infusion of therapeutics may be administered over a range of time. For infusions occurring in seconds and having transient pressure changes, the sensor should be placed within a space of sufficient cross-sectional surface area and at a sufficiently short distance from the distal aperture so as to monitor pressure changes occurring within a second (or less). Moreover, the pores at the distal end of the filter should be sufficiently small and have a relatively low cross-sectional area so that pressure fluctuations on the order of 0.01-0.2 seconds are dampened while the sensor responds in the 0.2-1 second time frame.

In one embodiment, a first pressure sensor 22 is mounted within the chamber 82. The first pressure sensor 22 may be mounted on the outer wall of the portion of the inner catheter 30 that extends within the occluder (as shown), on an inner portion of the filamentary braid, or another structure located within the chamber. The material covering or coating 76 on the distal portion 78 of the occluder 20 must be sufficiently fluid permeable such that when the occluder is positioned in a fluid-filled vessel and the chamber 82 is filled with a fluid, both the chamber and the distal vessel compartment will be subject to the same pressure conditions. Thus, the first pressure sensor 22 can accurately sense the fluid pressure conditions external of the occluder in the distal vascular compartment of the target vessel. However, the fluid permeable material 76 should effect a sufficient barrier to dampen turbulence generated at the orifice 84 of the infusion lumen during therapeutic infusion and the pressure effects thereof from causing pressure instability at the interior chamber of the occluder and a consequent deleterious effect on obtaining accurate pressure readings of the distal vascular compartment of the target vessel.

In accord with another preferred aspect of the system, a second pressure sensor 24 is preferably positioned proximal to the occluder 20. The second pressure sensor 24 is adapted to sense and monitor systemic pressure. The second pressure sensor 24 is also used in conjunction with the first pressure sensor 22 to determine pressure differentials; i.e., to determine when the distal vascular compartment pressure is higher than systemic pressure and by how much.

The use of both the first and the second sensors 22, 24 allows for a real time calculation of the pressure gradient across the occluder 20. As an alternative, the first pressure 22 alone can be used to determine a pressure gradient by obtaining a reference or baseline pressure reading prior to opening the occluder 20 across the vessel wall. Subsequent pressure readings from the first pressure sensor 22 are then compared to the baseline pressure to determine a gradient. The use of the gradient is described below.

Figure 4:
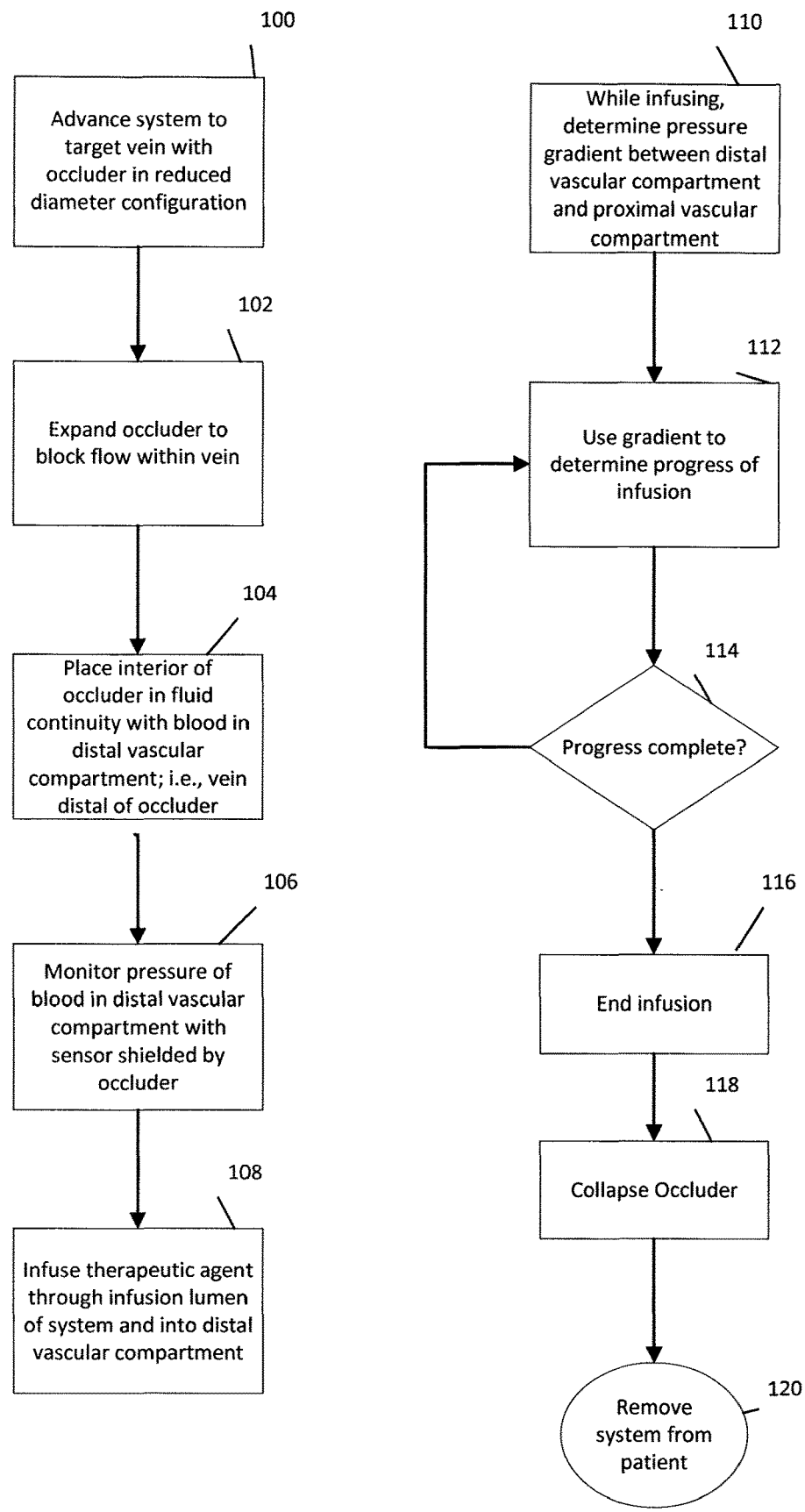
FIG. 4 is a flow chart of a method of using the system.

Turning now to FIG. 4, in accord with a method of using the system, the distal end of the system is advanced at 100 in the first elongate configuration to a target vessel of an organ in accord with known procedures. In that manner, the system 10 can be tracked over a guidewire through the venous system to the intended location. The target vessel is preferably a vein receiving a return supply of blood from an organ. By way of example, the organ can be the liver and the target vessel can be the saphenous vein, or the organ can be pancreas and the target vessel can be portal vein. Other organs can be similarly treated through associated target vessels, preferably wherein the target vessel is a vein.

The handle 50 is then actuated to move the inner catheter 30 relative to the outer catheter 32 and expand the diameter of the occluder 20 at 102 to bring the outer surface of the occluder into apposition with the vessel wall. The handle lock 64 can be operated to fix the occlusive configuration (size and shape) of the occluder 20 within the vessel. The occluder 20 occludes venous flow as the arterial side pressure of the blood flow within the vein applies force against the distal side of the occluder which urges the occluder into an open, expanded configuration.

Blood may begin to fill the chamber 82 of the occluder 20 through the apertures 80 of the fluid permeable coating or covering. Additionally or alternatively, a fluid such as saline or a similar flushing fluid can be infused from the second port 56, through the flushing lumen 42, and into the chamber 82 of the occluder. Because of the apertures 80 in the distal portion 78 of the occluder, the occluder does not necessarily inflate under pressure of the flushing fluid; rather the flushing fluid is intended to place the first sensor 22 in continuous fluid contact with the blood located external of the occluder. Once there is fluid continuity at 104, the pressure outside the occluder 20 and through the apertures can be sensed in real-time at the first sensor at 106. A baseline pressure reading of the vessel is preferably obtained.

Then, the therapeutic agent is infused at 108 through the infusion lumen 18 and out of the distal orifice 84 of the inner catheter, beyond the occluder 20. Infusion of therapy proceeds while pressure in the vessel distal of the occluder and optionally proximally of the occluder is monitored. The infusion of therapy out of the orifice of the infusion lumen can create local eddy currents in the fluid near the distal tip of the system. In prior systems, these eddy currents could prevent accurate pressure monitoring of the vessel conditions during infusion. In distinction therefrom, the first pressure sensor 22, within the chamber and shielded by the fluid permeable material, is protected from the deleterious effects of the eddy currents that obscure accurate monitoring. The apertures in or permeability of the distal portion of the occluder allows for fluid communication between the chamber and the distal vascular compartment. During infusion, pressure in the distal vasculature and the chamber equalize due to the apertures in the distal membrane. However, these apertures are sufficiently small and geometrically arranged as to dampen turbulence generated by the distal tip, allowing for stable pressure readings by the embedded first sensor. The stable (non-turbulent) pressure readings permit accurately identifying the pressure at the arterial side of the occluder. In addition, the second sensor 24, located proximal to where the expanded occluder 20 meets the vessel wall can be used to monitor at 110 the systemic pressure in real-time during infusion. This accurate pressure data can be used to determine pressure conditions within the tissue of the organ; i.e., whether over pressurization conditions exist and/or whether the interstitial fluid pressure within the tissue of the organ is overcome.

The second sensor 24 will be completely shielded from turbulent flow by the impermeable portion of the occluder 20. It therefore monitors physiological pressure variations from heartbeat, breathing, and other physiological phenomena. These variations from physiological phenomena occur on the 100s of milliseconds to seconds timeframe. The distal first sensor 22 also measures changes from physiological phenomena, as well as infusion of therapy and turbulence. Turbulence occurs over a very short time frame and can be filtered based on reference to the smoother pressure profile of the second sensor 24. While the porous nature of the distal occluder 20 geometry physically 'prefilters' the majority of noise from turbulent flow that would otherwise occur around the first sensor 22, in one embodiment of the method, it is contemplated that the noise from physiological phenomena is also reduced. Variations in measured pressure due to heartbeat, breathing, and other physiological phenomena registered on the proximal second sensor 24 can be subtracted from the distal first sensor 22 measurement, leaving only the pressure changes associated with infusion. In accord with the method, data processing of the received pressure data from the first and second sensors 22, 24 uses a filtering function to subtract turbulent flow data (short time frame pressure variation) and a subtraction function to remove variation due to broader physiological change. The filtering algorithm produces a pressure reading resulting from only the infusion of therapeutic agent through the infusion lumen.

Further, the real-time data from the first and second sensors allows a more direct determination of when pressure distal of the occluder increases relative to systemic pressure; i.e., when the first sensor senses higher pressure than the second sensor, as determined at 110.

During infusion of the therapeutic agent, the calculated gradient between the arterial feed of the vein (from the first pressure sensor) and the return venous side (from the second pressure sensor) permits monitoring progress of the therapeutic treatment at 112.

If the gradient identifies a higher pressure on the distal side, such indicates that there is not yet collateralization of the tissue compartments, as collateral flow will offer an alternative path for blood flow and will prevent such pressure gradient. Infusion of therapy proceeds while pressure is monitored, allowing the user to determine if over-pressurization is experienced and if interstitial fluid pressure within the tissue is overcome.

According to another aspect of a method with the system, the therapeutic agent can be infused through the device at a flow rate that will generate a vascular pressure gradient which increases the therapeutic diffusion rate through the venous and capillary vasculature.

To appreciate this advantage it is necessary understand that molecules residing within the blood or other fluid filter through the vessel based on pressure differentials between the fluid within the vessel and the surrounding tissues. In the arterial side, pressure is typically higher within the vessel than the surrounding interstitial pressure. This positive pressure gradient forces molecules out of the arterial end of the capillary bed and into the tissue. As blood travels through the arterial vessel, pressure drops, reducing the positive pressure gradient until no gradient is present and pressure mediated filtration of molecules through the vessel halts. On the venous side of the capillary bed a negative gradient is present, causing reabsorption of molecules back into the venous side capillaries and into systemic circulation. The change in pressure from the arterial side to the venous side is a result of difference in volume within the vessels in the direction of flow; the arterial side has less volume than the venous side resulting in a pressure drop as blood flows from arteries to veins.

When a vein becomes blocked by expansion of the occluder 20 across the vein, blood flow stops. Blood, being an incompressible fluid composed primarily of water, then equilibrates to the arterial side pressure.

The resulting change in pressure increases the volume of vessels experiencing a positive pressure gradient to the surrounding tissue, including venous vessels. This allows material to diffuse from the blood vessel outward throughout the entire tissue volume. The effect takes place in tissues that normally have a negative pressure gradient in which fluid and molecules would normally filter from the tissue into the vasculature. Thus, treatment of tissue on both the arterial and venous side is enabled. The duration and extent of the diffusion across the vessel wall and into the tissue can be controlled by the duration during which the occluder is left in the enlarged second configuration. Pressure may be further modulated by injecting one or more additional volumes of fluid into the venous network distal of the occluder. For example, one or more bolus injections of saline can be injected into the vessel to modify uptake of the therapeutic agent.

More specifically, the system when in position is used to sense pressure in the vessel volume distal of the occluder. This permits confirmation that the pressure in this volume is increased relative to a baseline pressure. Then, a therapeutic agent is infused through the infusion lumen into the vessel volume. The occluder is left open in the expanded configuration within the vessel according to a dwell function that identifies parameters for optimum diffusion across the vessel wall. For example, the dwell function can depend on the therapeutic agent (e.g., size of the molecule and molecular interaction with the vessel wall) and the measured pressure gradient. Holding other parameters constant, the larger the measured pressure gradient, the less time is required for optimal diffusion of the therapeutic agent into the tissue. The dwell time for a therapeutic maximizes the time in which the therapeutic resides within the target vasculature or, in other words, leaves the occluder open until the concentration of therapeutic in the blood of the vessel approaches zero and the concentration of the therapeutic in the surrounding target tissue increases to maximum availability from the dose. As the occluder blocks blood flow, this time is dependent upon the metabolic requirements of the tissue. In most cases the occluder may remain in place for up to 30 minutes before ischemic damage occurs to the tissue. This duration may be increased by the use of infusates that partially or totally replace the oxygen and nutrient requirements of the target tissues. By way of exemplar, such infusates include oxygenated saline or phosphate buffered solutions, Ringer's solutions, cellular growth mediums such as RPMI, MEM (minimal essential media), and DMEM, and intravenous sugar solutions such as 5% dextrose solution. Baring the metabolic needs of the surrounding tissue, the diffusion rate of the therapeutic molecule as predicted by molecular mass and positive pressure gradient measurements from the pressure sensor can be used to calculate therapeutic diffusion depth for a given dwell time. As capillaries typically rest no further than 100 μm from a given volume of tissue, the dwell time can be calculated to ensure full penetration of therapeutic to this depth.

A typical diffusion rate for a small molecule such as doxorubicin is on the order of 0.2-1 μm/sec at physiological pressure differentials of 10-30 mmHg from the vessel to surrounding tissue, allowing the drug to diffuse through the 100 μm tissue volume in 2-8 minutes. Higher molecular weight biological protein-based agent such as Immunoglobulin G (IgG) have much lower diffusion rates on the order of 0.0002 μm/sec at physiological pressure differentials of 10-30 mmHg, resulting in a diffusion time of 60 minutes to fully penetrate a 100 μm tissue volume. As the pressure differential increases, the rate of diffusion increases.

Various models can be used to calculate the diffusion rate of a molecule through the tissue. Most such models are based around Fick's law of diffusion in which diffusion occurs in response to a concentration gradient expressed as the change in concentration due to a change in position. The local rule for molecular movement or flux J is given by Fick's 1st law of diffusion:

$$J = -\chi \frac{\partial C}{\partial x},$$

in which the flux J [cm$^{-2}$ s$^{-1}$] is proportional to the diffusivity $\chi$ [cm$^2$/s] and the negative gradient of concentration, $$\frac{\partial C}{\partial x}[\text{cm}^{-3}\text{cm}^{-1}] \text{ or } [\text{cm}^{-4}].$$

Then, the distance of molecular penetration can be estimated by considering steady-state transport in one spatial dimension, wherein c(x) is concentration as a function of distance x, c(0)=c$_0$ is the source concentration, and x is the distance from the source, such that c→0 as x→∞. Assuming first order uptake kinetics, with an uptake rate of k$_u$c, then for diffusion-dominated transport, $$c = c_0^{\left(\frac{-x}{d_p}\right)}, \text{ where } d_p = \left(\frac{D}{k_u}\right)^{\frac{1}{2}}$$

where, D is the diffusivity and d$_p$ is the characteristic penetration distance. It is calculated how long it takes for the concentration (c$_o$) to approach 0, i.e., such that the therapeutic agent has diffused out of the vessel and into the surrounding tissue. Thus, the diffusive transport can be used to calculate a transport rate of the therapeutic agent and determine, in whole or in part, the consequent dwell time at which the occluder is to remain in an open expanded configuration post-infusion for appropriate therapeutic uptake into the target tissue.

It is also known that transport of molecules can be affected by pressure gradients. For convection-dominated transport with first-order kinetics based on the pressure differential between the vessel and the interstitial tissue, the equation can be applied with dp=u/ku, where u is the fluid velocity. As before, it is calculated how long it takes for the concentration (c$_o$) to approach 0, i.e., such that the therapeutic agent has diffused out of the vessel and into the surrounding tissue. Thus, the measured pressure gradient from the first and second sensors 122, 124 can be used to calculate a transport rate of the therapeutic agent and determine, in whole or in part, the consequent dwell time at which the occluder is to remain in an open expanded configuration post-infusion for appropriate therapeutic uptake into the target tissue.

Other factors such as the osmotic pressure can also be considered, measured, evaluated, modified, and used to determine a transport rate of the therapeutic agent and calculate, in whole or in part, the consequent dwell time at which the occluder is to remain in an open expanded configuration post-infusion for appropriate therapeutic uptake into the target tissue.

In addition, it is contemplated that the factors such as diffusion, pressure gradient, and/or osmotic pressure may be used in combination of two more to calculate a dwell time at which the occluder is to remain in an open expanded configuration post-infusion for appropriate therapeutic uptake into the target tissue.

Once the dwell time is complete and the dose of agent has been delivered 114, no additional therapeutic agent is delivered at 116. The proximal handle 50 is then actuated at 118 to collapse the occluder 20, and the system is then removed at 120 from the patient.

In accord with another method, substantially similar to the prior method, the system used includes a first (single) pressure sensor (and no second pressure sensor). All operations can be similarly performed with the exception that instead of constant real-time systemic pressure monitoring from the second sensor by which to compare the real-time, sensed distal vessel volume pressure from the first sensor in determining a pressure gradient, a baseline pressure is measured with the first pressure sensor prior to expanding the occluder across the vessel wall and used as a comparator for determining the gradient.

There have been described and illustrated herein embodiments of systems and methods for intravascular delivery of a therapeutic agent through a vessel to a tissue, such as an organ. While particular embodiments of the invention have been described, it is not intended that the invention be limited thereto, as it is intended that the invention be as broad in scope as the art will allow and that the specification be read likewise. Thus, it is recognized that the systems and methods may be applied to both humans and animals. Also, while examples of organs and disease states have been provided, such lists are not meant to be exclusive and the systems and methods are intended to be used where ever they would have therapeutic utility, in association with any such organs, disease states, and with any appropriate therapeutic agents now known or hereinafter discovered or developed. Also, the flexible tubular member can be any catheter arrangement meeting the needs of the device claimed, i.e., permitting passage of the therapeutic agent and actuation of the occluder. Further, while a preferred occluder has been described, other occluders may be used as well to assemble the systems and accomplish the methods described herein. It will therefore be appreciated by those skilled in the art that yet other modifications could be made to the provided invention without deviating from its scope as claimed.

What is claimed is:

1. A system for temporarily occluding a blood vessel, comprising:
   a) a flexible tubular member having a proximal end and a distal end, the flexible tubular member comprising an infusion lumen extending through the flexible tubular member between the proximal and distal ends, the infusion lumen having a distal orifice at the distal end;
   b) an expandable occluder comprising a braided construct of filaments mounted at the distal end of the tubular member, the braided construct having a proximal portion and a distal portion, the proximal portion covered with a fluid impermeable cover and the distal portion covered with a fluid permeable cover, an interior of the occluder encloses a chamber,
   the distal end of the tubular member extending through the occluder such that the orifice opens distal of the occluder; and
   c) a first pressure sensor located inside the chamber and positioned proximal to the fluid permeable cover, the first pressure sensor configured to sense pressure beyond the orifice by sensing pressure in the chamber, wherein the fluid permeable cover is located between the orifice and the first pressure sensor, and
   wherein the fluid permeable cover comprises radially symmetrically arranged apertures and is configured to be sufficiently permeable to permit fluid continuity between the chamber and a portion of the blood vessel distal to the occluder and to dampen an effect on the first pressure sensor of fluid turbulence from infusion of an infusate through the infusion lumen and out of the orifice.

2. The system of claim 1, wherein:
the occluder extends longitudinally along a central axis, and the occluder is symmetrical about the central axis and symmetrical about a central plane orthogonal to the central axis.

3. The system of claim 1, wherein:
the flexible tubular member includes a first catheter and a second catheter longitudinally displaceable relative to each other, the first catheter defining the infusion lumen, and a flush lumen defined at least partly through the second catheter.

4. The system of claim 3, further comprising:
an actuation handle having a stationary member and a movable member movable relative to the stationary member, the movable member longitudinally fixed relative to the first catheter, and the stationary member longitudinally fixed relative to the second catheter.

5. The system of claim 4, wherein:
the actuation handle includes, a first port on the movable member fluidly coupled to the first catheter and configured to introduce a first fluid into the first catheter, and a second port on the stationary member fluidly coupled to the second catheter and configured to introduce a second fluid through the flush lumen, wherein the flush lumen extends between the first and second catheters.

6. The system of claim 1, further comprising:
a second pressure sensor located outside the chamber, wherein the fluid impermeable cover is located between the second pressure sensor and the orifice.

7. The system of claim 6, wherein the second pressure sensor is fixed to the flexible tubular member.

8. A system for temporarily occluding a blood vessel, comprising:
a) an outer catheter having a proximal end and a distal end having a lumen extending through the outer catheter from the proximal end to the distal end of the outer catheter;
b) an inner catheter having a proximal end and a distal end, the inner catheter extending through the lumen of the outer catheter, wherein the inner catheter comprises an infusion lumen extending from a proximal end to a distal end of the inner catheter and opening to an orifice at the distal end of the inner catheter, wherein a flush lumen extends through at least a portion of a space between the outer catheter and the inner catheter;
c) an actuation handle coupled to the proximal ends of the outer and inner catheters configured to longitudinally displace one of the outer and inner catheters relative to the other;
d) a first port coupled to the actuation handle configured to receive infusion of an infusate through the infusion lumen;
e) a second port coupled to the actuation handle configured to receive infusion of a flush agent through the flush lumen;
f) an expandable occluder having a proximal portion and a distal portion, the proximal portion covered with a fluid impermeable cover and the distal portion covered with a fluid permeable cover, an interior of the occluder encloses a chamber, wherein the flush lumen is in fluid communication with the chamber, and the inner catheter extends through the occluder such that the orifice opens distal of the occluder; and
g) a first pressure sensor located proximal to the fluid permeable cover adapted to sense a pressure, wherein the fluid permeable cover comprises radially symmetrically arranged apertures and is located between the orifice and the first pressure sensor and the fluid permeable cover is configured to be sufficiently permeable to permit fluid continuity between the chamber and a portion of the blood vessel distal to the occluder and to dampen an effect on the first pressure sensor of fluid turbulence from infusion of an infusate through the infusion lumen and out of the orifice, the first pressure sensor is located in the second port, the flush lumen, or the chamber and adapted to be in fluid communication with the portion of the blood vessel distal to the occluder.

9. The system of claim 8, further comprising:
a second pressure sensor located outside the chamber and out of pressure communication with a portion of the blood vessel in fluid continuity with the orifice.

10. The system of claim 9, wherein the second pressure sensor is fixed to the outer catheter.

11. The system of claim 8, wherein the occluder comprises a braided construct of filaments mounted at the distal ends of the inner and outer catheters, and the fluid impermeable cover and fluid permeable cover are attached to the braided construct.

12. A system for delivering a therapeutic agent to a blood vessel of a patient, comprising:
a) a flexible tubular member having a proximal end and a distal end, the flexible tubular member comprising an infusion lumen extending through the flexible tubular member between the proximal and distal ends, the infusion lumen having a distal orifice at the distal end, wherein when the flexible tubular member is inserted into the blood vessel and a therapeutic agent is infused through the orifice, turbulence is induced in the blood in the blood vessel about the orifice;
b) an expandable occluder comprising a distal fluid permeable portion, the expandable occluder mounted at the distal end of the tubular member, and a chamber enclosed by the occluder,
the distal end of the tubular member extending through the occluder such that the orifice opens distal of the occluder; and
c) a first pressure sensor located inside the chamber and positioned proximal to the fluid permeable portion of the expandable occluder, the first pressure sensor configured to sense fluid pressure in the blood vessel distal of the occluder, wherein when the therapeutic agent is infused through the orifice and generates fluid turbulence in the blood vessel, the occluder is provided with the distal fluid permeable portion situated between the orifice and the first pressure sensor and the distal fluid permeable portion comprises radially symmetrically arranged apertures and is configured to be sufficiently permeable to permit fluid continuity from the chamber to a portion of the blood vessel distal of the occluder and dampen an effect of the fluid turbulence on the first pressure sensor.

13. A method of treating a patient with a therapeutic agent, comprising:
a) providing the system according to claim 12;
b) advancing the occluder of the system to a target vein of an organ;
c) expanding the occluder within the target vein;

d) initiating delivery of the therapeutic agent through the infusion lumen and out of the orifice;

e) monitoring pressure in the target vein distal of the occluder during the delivery with the first pressure sensor;

f) determining an endpoint of delivery of the therapeutic agent based on the monitored pressure; and g) ending delivery of the therapeutic agents at the determined endpoint.

14. The method of claim 13, wherein:

the device includes a second pressure sensor to sense fluid pressure in the blood vessel proximal of the occluder, and wherein the monitoring comprises determining a pressure gradient between the pressures sensed by the first and second pressure sensors, and the end point of delivery of the therapeutic agent is determined based on the monitored pressure and the pressure gradient.

15. The method of claim 13, further comprising:

prior to delivery of the therapeutic agent, communicating fluid between the first pressure sensor and the target vein distal of the occluder, to cause (i) blood to flow into an interior of the occluder or (ii) a flushing agent to be injected through a flushing lumen of the flexible tubular member and into the interior of the occluder and out of the occluder.

16. The system of claim 1, wherein the fluid permeable cover comprises apertures sized and shaped to permit fluid continuity from between the chamber and the distal vessel compartment and to dampen the effect of fluid turbulence of an infusion through the infusion lumen and out of the orifice on the first pressure sensor.

17. The system of claim 1, wherein:

the first pressure sensor is fixed to the flexible tubular member.

18. The system of claim 8, wherein:

the first pressure sensor is fixed to the inner catheter.

19. The system of claim 12, wherein:

the first pressure sensor is fixed to the flexible tubular member.

20. The system of claim 1, further comprising:

a second pressure sensor configured to sense fluid pressure in a proximal portion of the blood vessel that is proximal of the fluid impermeable cover.

21. The system of claim 8, further comprising:

a second pressure sensor configured to sense fluid pressure in a proximal portion of the blood vessel that is proximal of the fluid impermeable cover.

22. The system of claim 12, further comprising:

a second pressure sensor configured to sense fluid pressure in a proximal portion of the blood vessel that is proximal of the fluid impermeable cover.

* * * * *